United States Patent [19]
Lo et al.

[11] Patent Number: 5,425,136
[45] Date of Patent: Jun. 13, 1995

[54] THREE-DIMENSIONAL MAXIMUM A POSTERIORI (MAP) TRACKING

[75] Inventors: Allen K. Lo, Diamond Bar; Mark D. Skinas, deceased, late of Huntington Beach, Calif., by Kimberly A. Skinas, administrator; William J. Bangs, Fullerton, Calif.; William J. Bangs, Fullerton, all of Calif.

[73] Assignee: Hughes Aircraft Company, Los Angeles, Calif.

[21] Appl. No.: 855,283

[22] Filed: Mar. 23, 1992

[51] Int. Cl.[6] ............................................. G06F 15/62
[52] U.S. Cl. .................................. 395/127; 395/161; 73/861.25; 342/90; 367/124
[58] Field of Search ................................ 395/127–132, 395/161–163; 128/661.05, 661.08, 661.09, 660.04, 662.02; 364/487; 342/162, 90, 192; 73/861.25, 861.27, 641; 381/36, 46; 367/124

[56] References Cited

U.S. PATENT DOCUMENTS

| | | | |
|---|---|---|---|
| 4,182,173 | 1/1980 | Papadofransakis et al. | 73/861.27 |
| 4,559,602 | 12/1985 | Bates, Jr. | 364/487 |
| 5,014,250 | 5/1991 | Hadderingh | 367/124 |
| 5,016,641 | 5/1991 | Schwartz | 128/661.09 |
| 5,156,152 | 10/1992 | Yamazaki et al. | 128/661.08 |
| 5,262,785 | 11/1993 | Silverstein et al. | 342/162 |

Primary Examiner—Almis Jankus
Attorney, Agent, or Firm—W. K. Denson-Low

[57] ABSTRACT

An automatic detection apparatus and method applies the Short and Toomey algorithmic processing procedure to a frequency and beam direction windowed and time segmented set of Fast Fourier Transform (FFT) magnitude detected data, comprising time, frequency and beam direction data, to determine the presence or absence of narrowband lines indicative of target tracks. This is achieved by storing the time, frequency and beam direction data, and then processing this data using a predetermined three-dimensional maximum a posteriori procedure whereby individual target tracks associated with each beam direction are concurrently processed, and whereby transitions are made between adjacent beam directions in order to process target tracks having a maximum signal to noise ratio to provide for detection of a target. An output target track is generated by combining the high signal to noise ratio portions of the processed individual target tracks into a single output target track. The present invention extends the tracking capabilities that are obtained using the Short and Toomey processing procedure from two dimensions to three dimensions, and this added dimension provides spatial tracking in addition to spectral tracking. The spatial tracking is performed concurrently with the spectral tracking in an array processor.

7 Claims, 5 Drawing Sheets

THREE-DIMENSIONAL MAXIMUM A POSTERIORI (MAP) TRACKING

BACKGROUND

The present invention relates generally to tracking systems and methods, and more specifically, to a tracking system and method that provides for three-dimensional a posteriori tracking including spatial and spectral tracking.

With the current proliferation of array processors, multi-processors, and parallel programming, sonar data is beginning to overwhelm sonar data processors in the functional area of spatial processing (track linking and management across beams and other arrays of sensors). With this in mind, it would be desirable to apply a traditional data processing application (logic and decision making) to the area of array and multi-processor applications (vector arithmetic or number crunching).

A two-dimensional a posteriori concept is disclosed in an article entitled "Detection and Estimation of Frequency Random Signal," by R. D. Short and J. P. Toomey, in IEEE Transactions on Information Theory, Vol. IT-28, No. 6, November, 1982. The present invention expands on the capability of this processing concept by extending processing to three dimensions.

In a current system developed by the assignee of the present invention, the computation used to spatially cluster lines detected by multiple beams is accomplished by a general purpose computer. This is because the spatial clustering or association process primarily involves logical operations, hence is more suitable for general purpose computer implementation. This architectural design approach, however, results in a sub-optimum utilization of processing resources when three-dimensional processing is required. This is particularly true since an additional level of linking and association is required in order to maintain target track from node to node (an array of sensors) in the three-dimensional system.

It is therefore an objective of the present invention to take advantage of the processing power available in an array processor by extending a two dimensional Short and Toomey processing procedure to three dimensions to provide for both spatial and frequency tracking.

SUMMARY OF THE INVENTION

The present invention extends the Short and Toomey processing procedure from two dimensions to three dimensions and thus provides for a three-dimensional signal processing method for use in sonar signal processing, and the like. This added dimension provides spatial tracing in addition to spectral tracking. Spatial tracking is performed concurrently with spatial tracking in an array processor, whereas conventionally, the spatial tracking was performed in a data processor. The present invention offloads the data processor in a typical sonar system by vectorizing the spatial tracking logic into a third dimension, using a three-dimensional maximum a posteriori (MAP) tracker, and thus frees up a data processor for applications more suited to its architecture. This folding in of the spatial tracking into the same procedure as the spectral tracking which resides in an array processor immensely increases the data throughput capability of the system.

The automatic detection process of the present invention applies the Short and Toomey procedure to a frequency windowed and time segmented set of FFT magnitude detected data to determine the presence or absence of narrowband lines. The detected lines are then linked temporally and clustered spatially. This is achieved by processing the time, frequency and beam direction data using a predetermined three-dimensional maximum a posteriori procedure whereby individual target tracks associated with each beam direction are concurrently processed and whereby transitions are made between adjacent beam directions in order to process target tracks having a maximum signal to noise ratio to provide for detection of the target. An output target track is generated by combining the high signal to noise ratio portions of the processed individual target tracks into a single output target track. Because the procedure is mechanized for implementation on a high speed army processor, the detection process is capable of handling a much higher volume of throughput data than the current operational system. The present system exhibits superior detection performance over a variety of signal lines.

The present invention increases the processing throughput and improves tracking performance. By shifting the spatial tracking from a data processor to the array processor, higher throughput rams are achievable. The present invention transforms the logic and decision processing performed in the data processor to vector processing executed in the array processor.

The three-dimensional procedure of the present invention may be implemented on an FDS (Fixed Distributed System) currently under development for the Department of the Navy. The FDS is comprised of many nodes (arrays of sensors) at different locations. Each node is comprised of a sonar array which provides input to an array processor that performs beamforming processes in accordance with the present invention. The array processors in turn provide beamformed data to data processors for spatial tracking. With the present method, the efficiency of the processing is significantly increased and the load on the data processors is reduced, thus freeing them up for functions more suited for their data processing architecture.

More specifically, one aspect of the present invention provides for a three-dimensional maximum a posteriori tracking method for determining a path of a target moving through space. The method comprises the following steps. (1) Storing sample time interval, frequency and beam direction data comprising a three-dimensional set of FFT magnitude detected data that are representative of a three-dimensional image of a moving target. (2) Segmenting and windowing the stored three-dimensional FFT magnitude detected data in terms of frequency and time. (3) Processing the frequency windowed and time segmented set of FFT magnitude detected data to determine the presence of absence of narrowband lines that are indicative of the target. (4) Processing the detected narrowband lines using the three-dimensional maximum a posteriori procedure to provide detection of the target.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
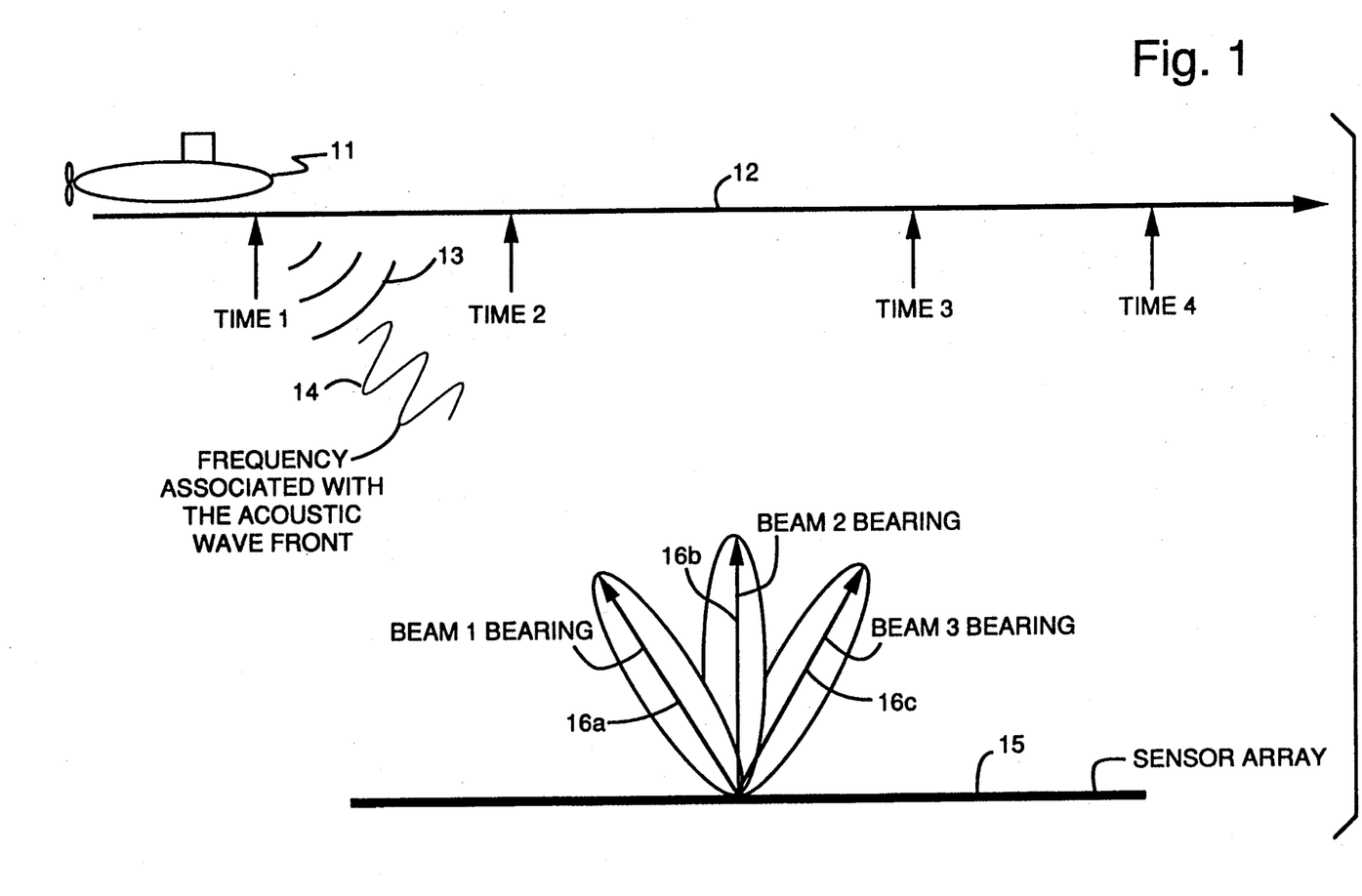
FIG. 1 is a diagram illustrating a typical operational scenario that is useful in explaining the principles of the present invention.

Referring to the drawing figures, FIG. 1 is a diagram illustrating a typical operational scenario that is useful in explaining the principles of the present invention. FIG. 1 shows a target 11, illustrated as a submarine, moving along a path 12. A plurality of time points (time 1, 2, 3, and 4) are shown along the path 12 which will be used to describe several processing procedures with reference to FIGS. 2 and 3 below. A plurality of plane waves 13 and the associated frequency 14 thereof are also shown relative to the position of the target 11 along its path. A sensor array 15 is located a distance away from the target 11 and three beams are shown that are generated by the sensor array 15. Each of the beams are indicative of separate bearing directions 16a, 16b, 16c, identified as beam 1 bearing, beam 2 bearing, and beam 3 bearing. As the target 11 moves along the path 12 the relative strength of the signals detected along each of the bearing directions changes with time. Target tracking is achieved by processing the signals associated with each of the beam directions, as will be discussed with reference to FIGS. 2 and 3.

Figure 2:
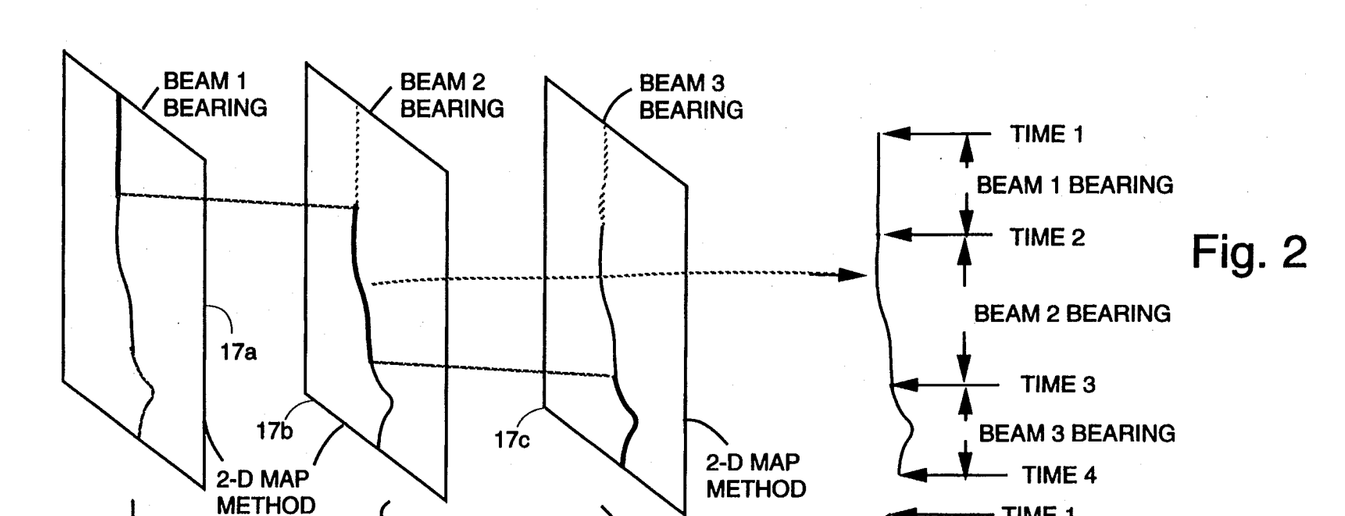
FIG. 2 illustrates three dimensional target tracking in accordance with the principles of the present invention.
Figure 3:
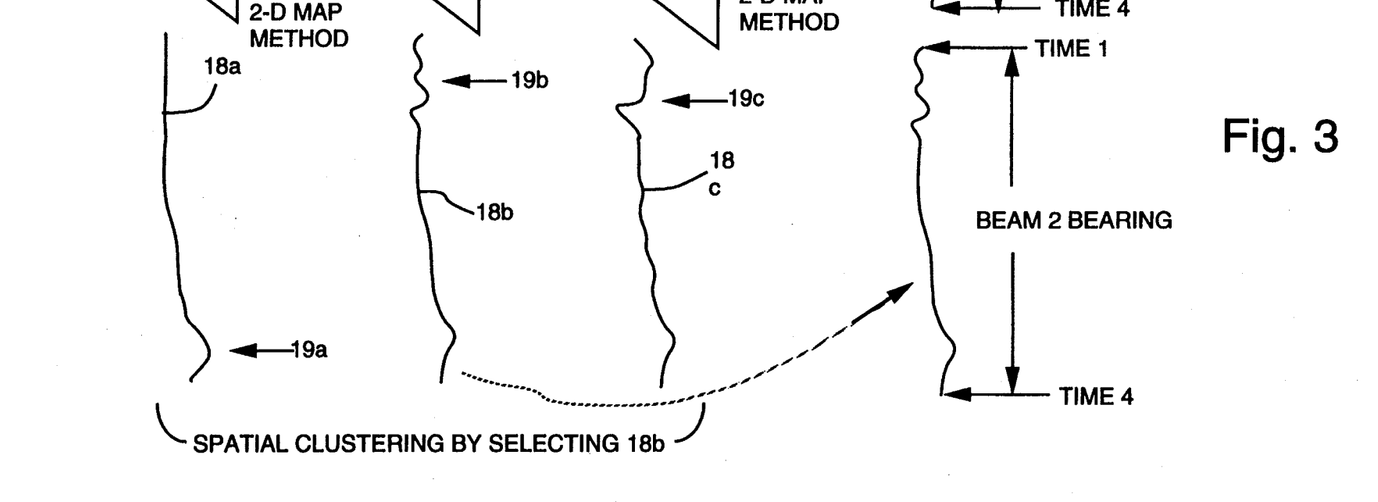
FIG. 3 illustrates two dimensional target tracking in accordance with conventional practices which may be used for comparative purposes in explaining the present invention.

FIG. 2 illustrates three-dimensional target tracking in accordance with the principles of the present invention, while FIG. 3 illustrates two dimensional target tracking in accordance with conventional practices which may be used for comparative purposes in explaining the present invention. FIG. 2 shows three sets of data known as lofargrams 17a, 17b, 17c, that are comprised of background noise, illustrated by the stippled (grey) portion of each lofargram 17a, 17b, 17c, and a target track, shown as having various signal to noise ratios, indicated by the intensity of the respective portion of the tracks in each lofargram 17a, 17b, 17c.

Referring to FIG. 3, the conventional processing procedure works as follows. The first lofargram 17a is processed to produce a first output track 18a, the second lofargram 17b is processed to produce a second output track 18b, and the third lofargram 17c is processed to produce a third output track 18c. In the areas of the respective tracks that have a low signal to noise ratio, shown as dotted lines in the lofargrams 17a, 17b, 17c of FIG. 2, the target tracks detected in the conventional procedure of FIG. 3 have noise, indicated by the wavy portions of the output tracks 18a, 18b, 18c identified by arrows 19a, 19b, 19c. The three respective target tracks 18a, 18b, 18c shown in FIG. 3 are then processed in the conventional procedure and a single target track, in this case output track 18b, would be selected as having the highest signal to noise ratio and hence the most probable target track that is the true frequency track and bearing of the target 11. However, due to the noise contained in the output tracks 18a, 18b, 18c, there is a substantial amount of error in detecting the mac bearing and frequency track of the target 11.

Referring to FIG. 2, the present invention processes the data contained in the lofargrams 17a, 17b, 17c in a different manner than the conventional procedure and achieves improved target tracking performance. This is achieved as follows. In the first lofargram 17a, the initial portion of the target track has a high signal to noise ratio. In the second lofargram 17a, the middle portion of the target track has a high signal to noise ratio. In the third lofargram 17a, the last portion of the target track has a high signal to noise ratio.

In order to generate a more accurate target track, the present invention processes the data from each of the lofargrams 17a, 17b, 17c and transitions between them to follow a track that has a maximum signal to noise ratio for the detected target track. Thus the present invention processes time, frequency and beam direction data in order to detect the target 11. This is shown at the right of FIG. 2, wherein the first portion of the data from the first lofargram 17a is combined with the middle portion of the data from the second lofargram and the last portion of the third lofargram 17c for each of the three time intervals shown in FIG. 1 (time 1 to time 2, time 2 to time 3, and time 3 t time 4). This produces a target track that is much more accurate that one produced using conventional processing procedures.

Figure 4:
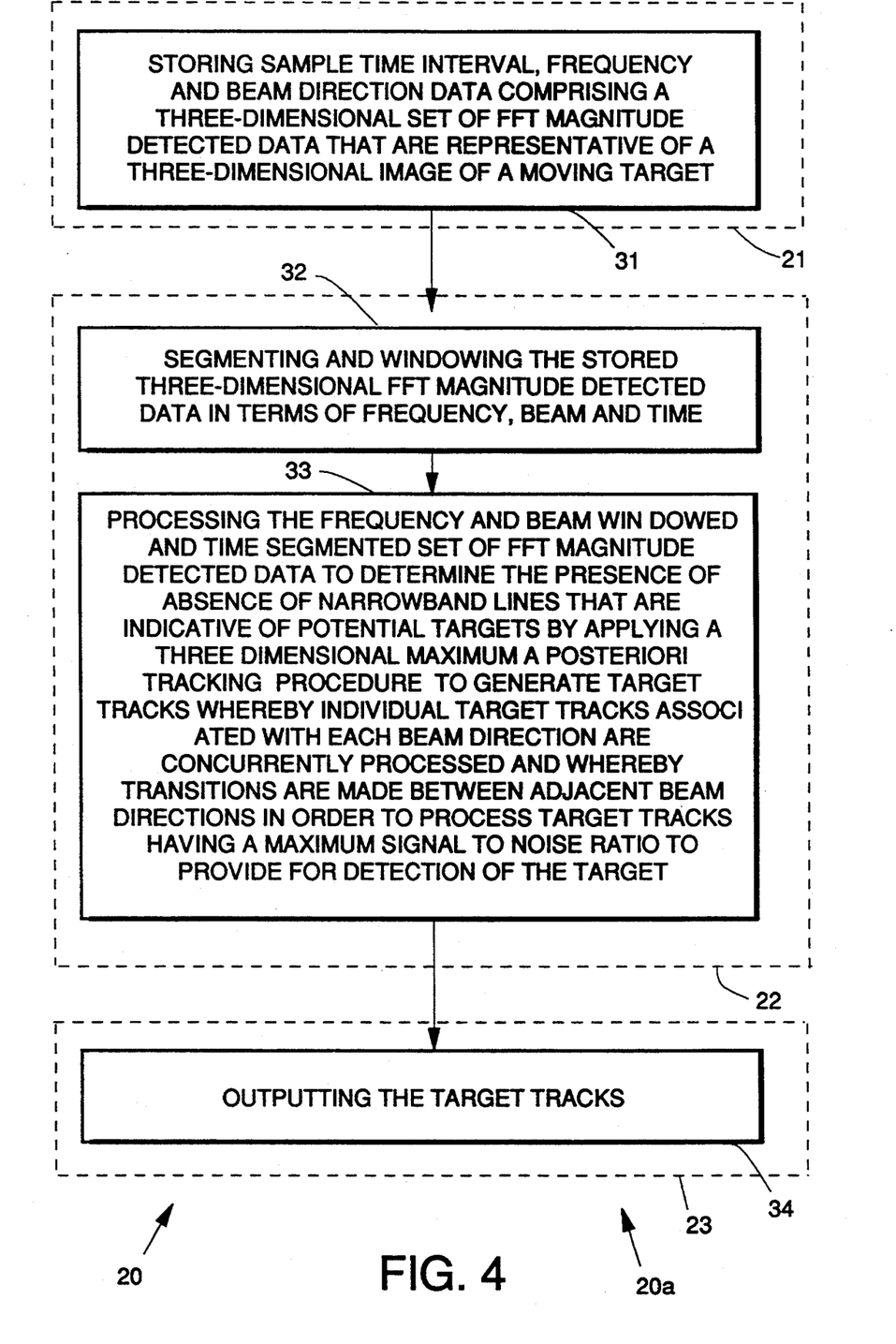
FIG. 4 shows a flow diagram of a tracking method that provides for three-dimensional a posteriori tracking including spatial and spectral tracking in accordance with the principles of the present invention.

FIG. 4 illustrates an apparatus 20 and a flow diagram for an automatic tracking method 20a that provides for three-dimensional a posteriori tracking in accordance with the principles of the present invention that includes both spatial and spectral tracking. The basic method 20a comprises the following steps. The first step comprises storing time, frequency and beam direction data comprising a three-dimensional set of FFT magnitude detected data that are representative of a three-dimensional image of a moving target, as is shown in box 31. The next step comprises segmenting and windowing the stored three-dimensional FFT magnitude detected data in terms of frequency, beam and time, as is shown in box 32. The next step comprises processing the frequency windowed and time segmented set of FFT magnitude detected data to determine the presence of absence of narrowband lines that are indicative of the target, as is shown in box 33. This step comprises processing the detected narrowband lines using a three-dimensional maximum a posteriori tracking procedure. This procedure comprises processing time, frequency and beam direction data and transitioning between beam directions in order to generate an output target track having the maximum signal to noise ratio for the target 11. The next step is to output the detected target track for use by an operator, as is shown in box 34.

This basic method 20a may also be described in other terms well-known to those in the sonar signal processing art. The three-dimensional maximum a posteriori tracking method 20 of the present invention is adapted to determine a path of a target moving through space. The tracking method comprises the following steps. Step 1: storing sample time interval, frequency and beam direction data comprising a three-dimensional set of FFT magnitude detected data representative of a three-dimensional image of a target moving through space, which data comprises a set of numerical values representative of sample time interval versus frequency data for each beam direction. This storage is achieved in a random access memory 21, for example. Step 2: processing the stored set of numerical values by sequentially processing a predetermined number of subarrays of numerical values such that numerical path values from each pixel of a previous time interval to each pixel of a current time interval are computed, and the largest integrated path value from one time interval to the next is determined, and the path through the entire set of numerical values that has the maximum integrated numerical value is indicative of the path of the target. This processing is achieved in a programmable compute 22, in an array processor 22, or in a customized integrated circuit chip 22, for example. Step 3: outputting the path of the target for use by an operator. This may be achieved by the use of a sonar or other display device 23 coupled to the computer 22, for example.

More particularly, the automatic detection method comprises a front-end signal line detection process corresponding to the Short and Toomey algorithm or processing procedure disclosed in the article entitled "Detection and Estimation of Frequency Random Signal," by R. D. Short and J. P. Toomey, in the publication IEEE Transactions on Information Theory, Vol. IT-28, No. 6, November, 1982, but which has been extended to three dimensions in accordance with the principles of the present invention. In this configuration, the automatic detection method first applies the Short and Toomey procedure to a frequency windowed and time segmented set of FFT magnitude detected data to determine the presence or absence of narrowband lines. The detected lines are then clustered spatially.

Because of the fact that the Short and Toomey algorithmic procedure is mechanized for implementation on a high speed array processor, the detection procedure is capable of handling much higher volume of throughput data than does the prior operational system. Besides exhibiting superior detection performance over a variety of signal lines, this ability of processing high volume of data using an array processor has made the Short and Toomey procedure a very desirable automatic detection procedure.

Figure 5:
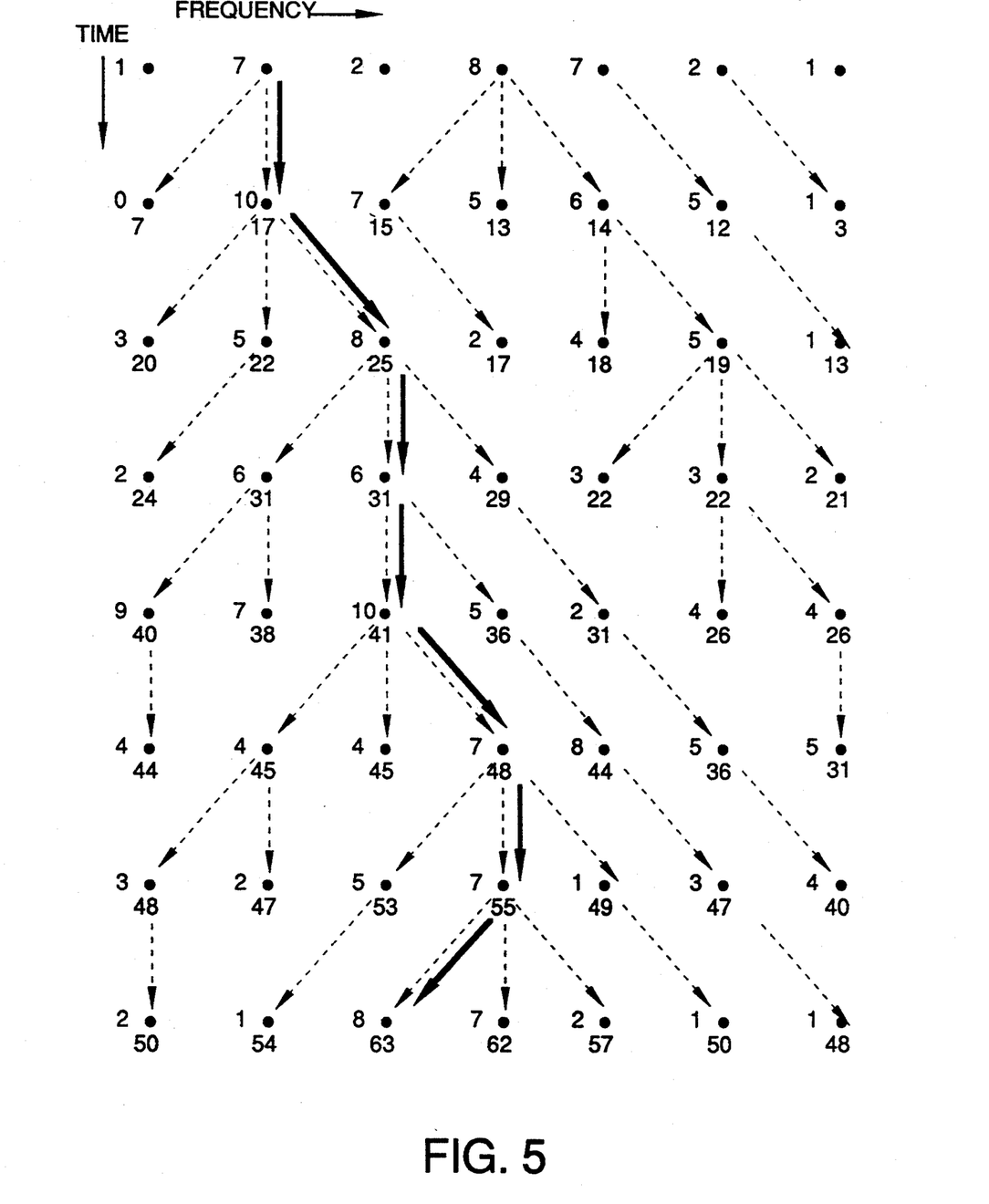
FIG. 5 shows a two-dimensional example of the method of the present invention.

FIG. 5 shows a two-dimensional example of the method 20a of the present invention. In FIG. 5, each dot represents a time-frequency data point. The number adjacent the left side of each dot represents the value of the signal associated with the dot. The dashed and arrowed lines show the integration path through the data with respect to the transition from a higher row to a lower row. Typically a window is set to process the data, and in this example, the window is three data points wide. That is to say, each data point in the second row can have its signal added to three data values in the preceding row: namely directly above it, to the right one data point, and to the left one data point. The largest preceding value is chosen for integration. Also the boundary points only integrate using two upper data point values. In addition, if two or more of the three values in the preceding row are the same, then the integration path for the data point in the succeeding row is taken from the data point directly above it.

Thus, and with reference to FIG. 5, in the second row, the first two points are integrated with the second data point of the first row (value=7), the third, fourth and fifth data points in the second row are integrated with the fourth data point in the first row (value=8), while the sixth (value=7) and seventh (value=2) data points in the second row are integrated with the fifth and sixth data points in the first row, respectively. The integrated data values for the data points of the second row are shown below each respective point. This process continues for each of the data rows shown in this example, until a cumulative integrated value is generated for each row. Then, starting at the data point with the greatest value (value=63), and proceeding backward (a posteriori) through the data points having the highest value in each row, the target track is determined. This is illustrated by the relatively dark solid arrowed line traced through FIG. 5.

Figure 6:
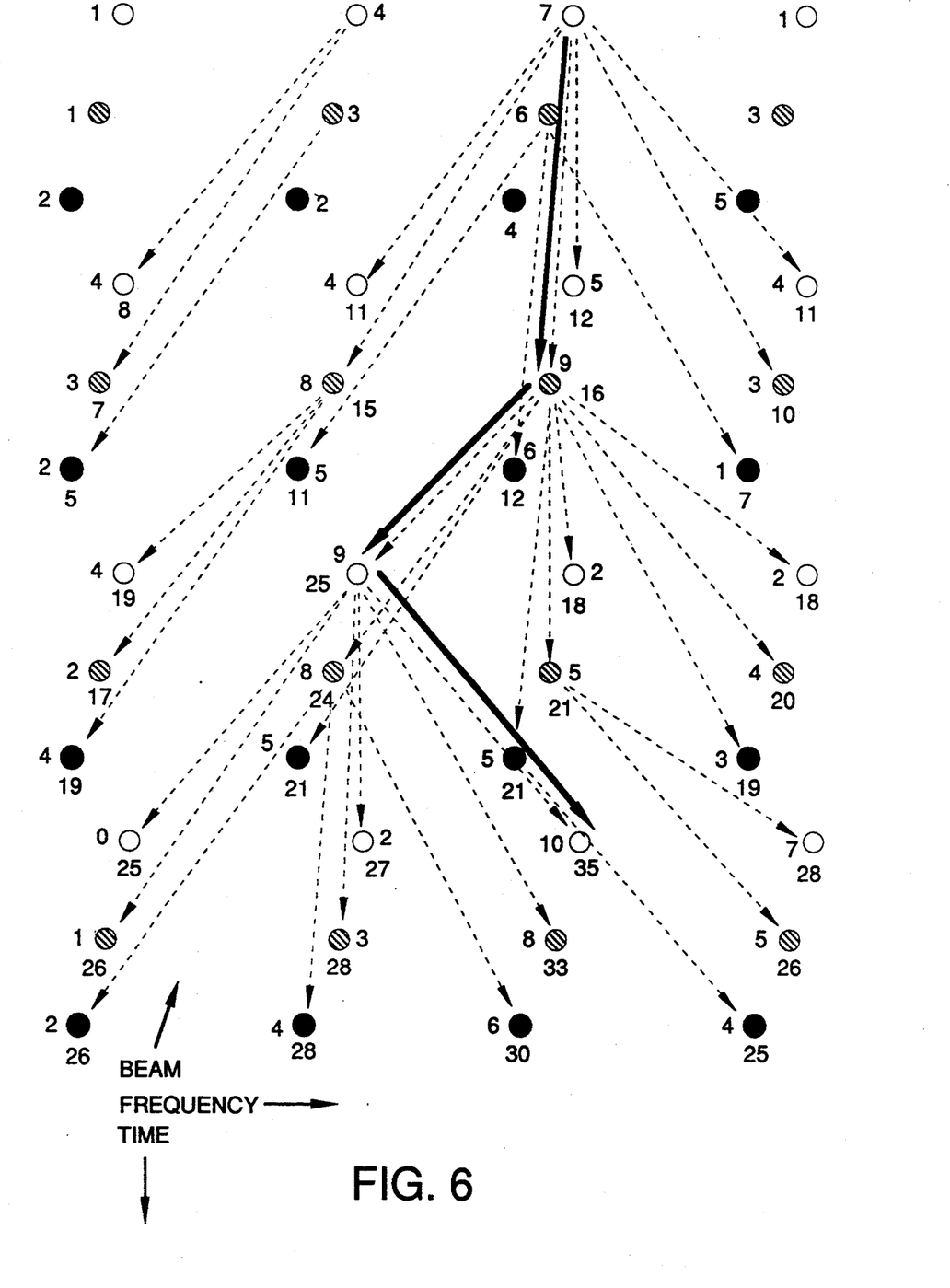
FIG. 6 shows a simplified three-dimensional example of the method of the present invention.

FIG. 6 shows a simplified three-dimensional example of the method 20a of the present invention. FIG. 6 shows time, frequency and beam data points associated with a moving target. FIG. 6 is more complex, since it is a three-dimensional array of data points. Only a few points are shown for clarity in FIG. 6. The procedure is exactly the same as described with reference to FIG. 5, but the additional dimension requires a window that is 3 by 3 in size, for example. The data values are shown either to the side of the respective data points, while the integrated values are shown generally below the points. The locations of the numerical values have been located so that they will be more legible on the drawing. The target track is illustrated by the relatively dark solid arrowed line traced through FIG. 6.

The three-dimensional procedure of the present invention may be implemented on an FDS (Fixed Distributed System) currently under development for the Department of the Navy. The FDS is comprised of many nodes (arrays of sensors) at different locations. Each node is comprised of a sonar array which provides input to an array processor that performs beamforming processes in accordance with the present invention. The array processors in turn provide beamformed data to data processors for spatial tracking. With the present method, the efficiency of the processing is significantly increased and the load on the data processors is reduced, thus freeing them up for functions more suited for their data processing architecture. Array processors are designed specifically to operate optimally on vector arithmetic. The three-dimensional maximum a posteriori procedure is a suitable candidate for vector processing, as is any procedure that contains "DO loop" processing procedures.

The following is a detailed statement of the method 20a of the present invention that extends the maximum a posteriori procedure to three dimensions. As was stated above, this method is implementable in many ways, including both hardware and software implementations. The following definitions are employed herein.

| Name | Definition |
| --- | --- |
| t | time index/units = bins |
| f | frequency index/units = bins |
| s | spatial index/units = beams |
| NT | total number of time bins |
| NF | total number of frequency bins |
| NS | total number of spatial bins |
| pf | spectral probability path index |
| ps | spatial probability path index |
| fpath | spectral path search limit |
| spath | spatial path search limit. |
| fmax | spectral index where maximum occurs |
| Smax | spatial index where maximum occurs |
| Cmax | global maximum of cost function |
| p(f,s) | path transition probability function from time bin $t-1$ to $t$. |
| X(t,f,s) | spectral magnitude bin at time bin t, frequency bin f, and |

-continued

| Name | Definition |
|---|---|
| | spatial beam s. |
| Y(t,f,s) | transition function |
| C(t,f,s) | cost function |
| T(t) | three-dimensional track function |
| T1(t) | spectral component of track function |
| T2(t) | spatial component of track function |

The following six equations define the mathematical steps that implement the three-dimensional tracking method 20a of the present invention. These steps may be implemented in software or hardware, such as by an array processor, or a customized integrated circuit chip adapted to implement the logic of the processing steps.

$$C(t,f,s) = X(t,f,s) + \text{Max-}\{\log[p(f+pf,s+ps)] + C(t-1,f+pf,s+ps)\} \quad (1)$$

where $pf = -fpath, \ldots, fpath$, and $ps = -spath, \ldots, spath$.

$Y(t,f,s) = $ a vector containing frequency and beam transition values $\{pf,ps\}$ at which $C(t,f,s)$ of equation (1) attain a maximum value. (2)

After the procedure has been applied onto an entire acoustic data set, a maximum of the cost function, Cmax, is selected as follows:

$$Cmax = \text{Max}\{C(NT,f,s)\}, \text{ for } (f=1,\ldots,NF),(s=1,\ldots,NS) \quad (3)$$

and set fmax and smax equal to the value of f and s at which Cmax occurs.

Now, with the fmax and smax determined, the three-dimensional MAP track is computed recursively backward using the path transition array Y(t,f,s) of equation (2).

$$T(t-1) = T(t) + Y(t-1, T1(t-1), T2(t-1)) \quad (4)$$

Equation (4) is initialized as follows $$T(NT) = \{fmax, Smax\} \quad (5)$$

where T(t) is defined in equation (6).

$T(t) = \{T1(t), T2(t)\}$, a vector specifying the MAP track in frequency bins $T1$, and beam bins $T2$, as a function of time $t$. (6)

The attached appendix provides the pseudo code and definitions for the three-dimensional maximum a posteriori procedure in accordance with the present invention.

Thus there has been described a new and improved tracking system and method that provide for three-dimensional a posteriori tracking using spatial and spectral tracking. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

APPENDIX

This appendix provides the pseudo code and definitions for the three-dimensional maximum a posteriori procedure in accordance with the present invention.

| Definitions: | |
|---|---|
| t | time index/units = bins |
| f | frequency index/units = bins |
| s | spatial index/units = beams |
| hv | spatial (horizontal)/spectral (vertical) index for transition array: hv = 0, spectral; hv = 1, spatial. |
| NT | total number of time bins |
| NF | total number of frequency bins |
| NS | total number of spatial bins |
| pf | spectral probability path index |
| ps | spatial probability path index |
| max | temporary variable to hold current maximum |
| fpath | spectral path search limit |
| spath | spatial path search limit. |
| fmax | spectral index where maximum occurs |
| smax | spatial index where maximum occurs |
| p(f,s) | path transition probability matrix from time bin t−1 to t. |
| X(t,f,s) | spectral magnitude bin at time bin t, frequency bin f, and spatial beam s. |
| Y(t,f,s,hv) | three-dimensional MAP path transition index array at time bin t, frequency bin f, and spatial beam s, containing two values, one for hv = 0 (spectral) and one for hv = 1 (spatial) |
| Cost(t,f,s) | cost function |
| CostTemp | temporary cost function |
| Trk(t,hv) | three-dimensional track matrix |
| FOR s = 1, NS | ! loop over spatial index |
|   FOR f = 1, NF | ! loop over spectral index |
|     Cost(1,f,s) = X(1,f,s) | ! initialize cost function array to spectral magnitude values for temporal bin 1 |
|   ENDFOR | ! end spectral loop |
| ENDFOR | ! end spatial loop |
| FOR t = 2,NT | ! loop over temporal index |
|   FOR s = 1,NS | ! loop over spatial index |
|     FOR f = 1,NF | ! loop over spectral index |
|       Cost(t,f,s) = Cost(t−1,f,s) | ! save old Cost function |
|     ENDFOR | ! end spectral loop |
|   ENDFOR | ! end spatial loop |
|   FOR s = 1, NS | ! loop over spatial index |
|     FOR f = 1, NF | ! loop over spectral index |
|       Y(t,f,s,0) = 0 | ! initialize spectral Cost index array |
|       Y(t,f,s,1) = 0 | ! initialize spatial Cost index array |

APPENDIX-continued

This appendix provides the pseudo code and definitions for the three-dimensional maximum a posteriori procedure in accordance with the present invention.

Definitions:

```
        max = -32768                          ! initialize max to largest available negative number
        FOR ps = -spath, spath                ! loop on spatial transition probability index
          sindex = s + ps                     ! form spatial cost index
          IF((sindex > 0) and                 ! check spatial bounds
             (sindex <(NS+1)))
            FOR pf = -fpath, fpath            ! loop on spectral transition probability index
              findex = f + pf                 ! form spectral cost index
              IF( (findex > 0) and            ! check spectral bounds
                  (findex <(NF+1)))
                CostTemp=Cost(t-1,            ! temporary cost
                  findex, sindex) + p(pf, ps)
                IF(CostTemp > max) then       ! test cost against max
                  max=CostTemp                ! update max cost
                  Y(t-1,f,s,0) = pf           ! update spectral index array
                  Y(t-1,f,s,1) = ps           ! update spatial index array
                ENDIF                         ! end max cost test
              ENDIF                           ! end spectral bounds check
            ENDFOR                            ! end spatial spatial transition probability loop
          ENDIF                               ! end spatial bounds check
        ENDFOR                                ! end spatial spatial transition probability loop
        Cost(t,f,s) = max + X(t,f,s)          ! construct new cost function
      ENDFOR                                  ! end spectral loop
    ENDFOR                                    ! end spatial loop
ENDFOR                                        ! end temporal loop
max = Cost(NT,1,1)                            ! initialize max to cost of spectral, spatial bins 1,1
fmax = 1                                      ! initialize spectral index to bin 1
smax = 1                                      ! initialize spatial index to bin 1
FOR s = 1,NS                                  ! loop over spatial index
  FOR f = 1,NF                                ! loop over spectral index
    IF(Cost(NT,f,s) > max) then               ! test for global maximum
      fmax = f                                ! spectral bin where current max occurs
      smax = s                                ! spatial bin where current max occurs
      max = Cost(NT,f,s)                      ! magnitude of current global maximum
    ENDIF                                     ! end global maximum test
  ENDFOR                                      ! end spatial loop
ENDFOR                                        ! end temporal loop
Trk(NT,0) = fmax                              ! initialize spectral track to fmax
Trk(NT,1) = smax                              ! initialize spatial track to smax
FOR t = NT, 2,-1                              ! loop backward through time
  Trk(t-1,0) = Trk(t,0) +                     ! form spectral track from index
    Y(t-1, Trk(t,0), Trk(t,1),0)
  Trk(t-1,1) = Trk(t,1) +                     ! form spatial track from index
    Y(t-1, Trk(t,0), Trk(t,1),1)
ENDFOR                                        ! end temporal loop
```

What is claimed is:

1. A three-dimensional tracker for determining a path of a target moving through space, said tracker comprising:

storage means for storing sample time interval, frequency and beam direction data comprising a three-dimensional set of Fast Fourier Transform (FFT) magnitude detected data representative of a three-dimensional image of a target moving through space, which data comprises a set of numerical values representative of sample time interval versus frequency data for each beam direction, said sample time intervals covering a time period of interest;

processor means for processing said stored set of numerical values by sequentially processing a predetermined number of subarrays of numerical values such that numerical path values from each numerical value of a previous time interval to each numerical value of a current time interval are computed, a largest integrated path value from one time interval to a next time interval is determined, and the path through the entire set of numerical values that has a maximum integrated numerical value is indicative of the path of the target over said time interval of interest; and means for outputting the path of the target over said time interval of interest, said target path as indicated by said path through said entire set of numerical values that has said maximum integrated numerical value.

2. The tracker of claim 1 wherein the means for processing the stored set of numerical values comprises an array processor.

3. The tracker of claim 1 wherein the means for storing sample time interval, frequency and beam direction data comprises a memory.

4. The tracker of claim 1 wherein the means for outputting the path of the target comprises a display.

5. A three-dimensional tracking method adapted to determine a path of a target moving through space, said tracking method comprising the steps of:

storing sample time interval, frequency and beam direction data comprising a three-dimensional set of Fast Fourier Transform (FFT) magnitude detected data representative of a three-dimensional image of a target moving through space, which data comprises a set of numerical values representative of sample time interval versus frequency data for each beam direction, said time intervals covering a predetermined time period;

processing the stored set of numerical values by sequentially processing a predetermined number of sub-arrays of numerical values such that numerical path values from each numerical value of a previous time interval to each numerical value of a current time interval are computed, a largest integrated path value from one time interval to a next time interval is determined, and the path through the entire set of numerical values that has a maximum integrated numerical value is indicative of the path of the target; and outputting the path of the target.

6. The tracking method of claim wherein the step of processing the stored set of numerical values is performed by an array processor.

7. A three-dimensional tracking method for determining a path of a target moving through space, said method comprising the steps of:

storing sample time interval, frequency and beam direction data comprising a three-dimensional set of Fast Fourier Transform (FFT) magnitude detected data representative of a three-dimensional image of a moving target over a time period of interest;

time segmenting and frequency windowing the stored three-dimensional FFT magnitude detected data;

processing the frequency windowed and time segmented set of FFT magnitude detected data to determine the presence or absence of narrowband lines indicative of a target track by processing time, frequency and beam direction data using a predetermined three-dimensional maximum a posteriori procedure whereby individual target tracks associated with each beam direction are concurrently processed and whereby transitions are made between adjacent beam directions in order to process target tracks having a maximum signal to noise ratio to provide for detection of the target, and whereby an output target track is generated by combining high signal to noise ratio portions of the processed individual target tracks into a single output target track; and outputting the output target track to a display device.

* * * * *